UNITED STATES PATENT OFFICE.

HERBERT M. GREENE, OF PORTLAND, OREGON.

PROCESS OF COOKING GRAIN AND A PRODUCT FOR EFFECTING THE SAME.

1,424,132. Specification of Letters Patent. Patented July 25, 1922.

No Drawing. Application filed October 18, 1920. Serial No. 417,625.

*To all whom it may concern:*

Be it known that I, HERBERT M. GREENE, a citizen of the United States of America, and resident of city of Portland, in the county of Multnomah, in the State of Oregon, have invented a certain new and useful Process of Cooking Grain and a Product for Effecting the Same, of which the following is a specification.

My invention relates to improvements in the culinary art relating to the cooking of grains, whereby the same is greatly expedited and facilitated, economy therein is promoted, and all desirable natural constituents of the material are kept unimpaired.

My invention is applicable to the cooking of grains generally, but, since it is particularly well exemplified in the cooking of oats, that kind of grain is taken for specific consideration in the following specification.

In the art as hitherto understood, the final preparation of oats, for example, as an article of food for human consumption, requires either that it be boiled for hours, even though subdivision of the grain be effected to reduce it to finer particles than those which nature provides, or that a cooking heat be applied to it under conditions that are not available in the ordinary domestic kitchen.

To meet that condition, it has become the usual commercial practice partially to cook the grain before putting it upon the market for sale to the ultimate consumer, so as to enable the housekeeper, by cooking it for only a comparatively brief space of time, to prepare it for the table. Such is the method of treating the grain in the manufacture of what is known in commerce as rolled oats and of similar articles.

The method last referred to, while it is accepted as a compromise, is objectionable for the reason that it adds unduly to the cost of the article, impairs its savor and keeping qualities, and detracts from its palatability, while, at the same time, it robs it, as do all such methods with which I am acquainted, of a part of its nutritive value.

My invention is based upon the discovery that the necessity for the protracted application of heat for the cooking of grain is due to differences between relative specific gravities of the boiling liquid. By previous methods, a long initial boiling in water—a liquid of comparatively low specific gravity—was necessary in order, through cooking, to raise the specific gravity of the liquid by development, obtained from the constituent elements of the grain. After that development is fully attained, cooking of the grain follows quickly.

By my invention, a higher specific gravity in the liquid is developed and consequently immediate cooking begins to be effected substantially at once upon the application of a sufficient degree of heat. Thereby, without any preliminary subjection to heat, grain may be thoroughly cooked in a space of time not longer, substantially, than that which is necessary for the final preparation of partially pre-cooked products, such as rolled oats, for example, as above explained.

In the cooking of natural grains, such as oats, for example, an initial boiling period extending over several hours is necessary to develop the mucilaginous substance which the grain contains, as for example gluten in wheat. Oats, corn, rye, &c., contain no gluten, which is found only in wheat. After the mucilaginous substance, whatever it be, is at length developed, it affords, in the boiling medium, a heat retaining envelope to the grain of increased specific gravity which, after it is developed, holds the heat in contact with each particle of the grain, with a cooking effect that a thin boiling medium of low specific gravity like water only, will not give. To illustrate, the effect of atmospheric pressure in controlling the cooking of substances is well known. Water, boiling at 212° Fahrenheit as it does at sea level, atmospheric pressure, is ordinarily employed to cook, for example, potatoes. At high altitudes, however, the boiling point of water may be so much reduced as to prohibit the cooking of potatoes by such boiling in the open atmosphere. Again, cooking by boiling under pressure of an artificial atmosphere in a closed container can be accomplished, anywhere, irrespective of altitude. I have discovered that through the employment of a boiling medium of a sufficient viscidity—measured by its increase of specific gravity as compared with water boiling at 212° Fahrenheit—heat applied to it is retained within its volume with a cooking effect comparable to the effect obtained by increase of natural atmospheric pressure or by increase of pressure attained by boiling in the artificial atmosphere of a closed container.

After the mucilaginous envelope is once formed, in any way, the cooking of the grain is accomplished in brief space of time, the necessity of boiling for a long period, as hitherto required, being due only to the length of time required to develop the glutinous or mucilaginous constituents of the natural grain, and to convert the thin boiling medium,—ordinary water—into a mucilaginous boiling medium of heavier specific gravity. Upon discovery of the fact as stated in the last preceding sentence and its underlying reason, is based my invention, which, for producing a commercial article, consists in providing, in sufficient quantity, with the grain an admixture of a dry substance, for example wheat gluten that, upon the application of water and heat, will quickly become viscous, mucilaginous, or glutinous, with the result that the final stage of the cookery begins to be attained substantially at once and without the preliminary boiling that is otherwise necessary as a condition precedent to development of mucilaginous substance from the natural grain.

The admixture above referred to may be obtained adventitiously or by a method of grinding the grain itself so that it is quickly convertible by water and heat into a mucilaginous or viscous boiling medium.

If obtained by the grinding of the grain itself, the method employed must produce in effect two articles, one granular and the other pulverulent. If the admixture be obtained by an adventitious addition, in selecting the adventitious substance to be used care must be exercised to employ a neutral substance, that is to say, one which will not in any wise deleteriously affect the cooked product, as by modification of its savor.

In the practice of my process, any grain of natural dimensions, after hulling or after being subdivided, if preferred, into smaller particles as by grinding or by any crushing or cutting method, may be used. The process contemplates the subjection to a cooking heat of the grain submerged and covered in an adventitious boiling medium having a viscosity sufficient to hold the heat applied in close operative contact with each particle of the grain with immediate cooking effect thereupon.

In respect to the commercial product in its preferred form, my invention consists of the combination of a dry granular substance with an adventitious admixture of a dry substance that is quickly convertible by boiling in water into a viscous or mucilaginous envelope, said combination being adapted to be sold to the consumer as an article of commerce ready for use. Boiling in water for a brief space of time of the commercial article is all that is necessary to thoroughly cook it and prepare it for the table.

What I claim is:

1. The process of cooking grain which consists in subjecting the grain to the initial action of a cooking heat in a viscous neutral boiling medium.

2. The process of cooking grain which consists in first mixing the grain with a substance that is quickly convertible by the application of water and heat into a viscous boiling medium and then boiling the mixture in water, thereby converting said mixture into a mucilaginous envelope for each particle, and cooking the grain.

3. A new article of manufacture consisting of the mixture of a granular vegetable substance with a dry substance that is quickly convertible by boiling in water into a viscous boiling medium for the cooking of the granular constituent of the mixture.

4. A new article of manufacture consisting of the combination of a granular vegetable substance with an adventitious admixture of a dry substance that is quickly convertible by boiling water into a viscous boiling medium for the cooking of the granular constituent of the combination.

In testimony whereof, I have hereunto set my hand in the presence of two subscribing witnesses.

HERBERT M. GREENE.

Witnesses:
  JOSEPH L. ATKINS,
  LEICESTER B. ATKINS.